(12) United States Patent
Schroeder

(10) Patent No.: US 7,870,713 B2
(45) Date of Patent: Jan. 18, 2011

(54) SICKLE GUARD WITH INTEGRAL STREAMLINED AIR DISCHARGE SYSTEM FOR BLOWING PLANT MATERIAL TOWARD A HEADER OF AN AGRICULTURAL PLANT CUTTING MACHINE

(75) Inventor: Jay D. Schroeder, Coal Valley, IL (US)

(73) Assignee: CNH America LLC, New Holland, PA (US)

( * ) Notice: Subject to any disclaimer, the term of this patent is extended or adjusted under 35 U.S.C. 154(b) by 352 days.

(21) Appl. No.: 12/069,506

(22) Filed: Feb. 11, 2008

(65) Prior Publication Data

US 2009/0199529 A1    Aug. 13, 2009

(51) Int. Cl.
*A01D 34/18*    (2006.01)

(52) U.S. Cl. .......................... 56/298; 56/12.8; 56/12.9; 56/307

(58) Field of Classification Search .................. 56/12.8, 56/12.9, 13.1, 14.3, 16.8, 32, 158, 257–287, 56/289, 296, 298, 307, DIG. 20, DIG. 24
See application file for complete search history.

(56) References Cited

U.S. PATENT DOCUMENTS

| | | | | |
|---|---|---|---|---|
| 859,602 A * | 7/1907 | Green | ........................ | 56/296 |
| 2,654,987 A * | 10/1953 | Mills et al. | .................... | 56/310 |
| 2,670,586 A * | 3/1954 | Phillips | ........................ | 56/158 |
| 2,718,744 A | 9/1955 | Phillips | ........................ | 56/158 |
| 2,734,331 A | 2/1956 | Phillips | ........................ | 56/296 |
| 2,737,006 A | 3/1956 | Klingler | ........................ | 56/158 |
| 3,555,790 A | 1/1971 | Quick | ........................ | 56/21 |
| 3,584,787 A * | 6/1971 | Thomason | .................... | 239/121 |
| 4,168,798 A * | 9/1979 | Moore et al. | .................... | 239/121 |
| 4,273,285 A * | 6/1981 | Scholbrock | .................... | 239/121 |
| 4,359,188 A * | 11/1982 | Moore | ........................ | 239/121 |
| 4,783,951 A | 11/1988 | Richards et al. | .............. | 56/12.9 |
| 4,866,919 A | 9/1989 | Brooks | ........................ | 56/12.9 |
| 4,936,082 A | 6/1990 | Majkrzak | ........................ | 56/220 |
| 5,431,000 A | 7/1995 | Shuknecht | .................... | 56/308 |
| 5,457,948 A * | 10/1995 | Willeby | ........................ | 56/30 |
| 6,085,510 A | 7/2000 | McDonnell | .................. | 56/298 |
| 7,591,127 B1 * | 9/2009 | Stacer et al. | .................. | 56/12.9 |

* cited by examiner

*Primary Examiner*—Thomas B Will
*Assistant Examiner*—Mai T Nguyen
(74) *Attorney, Agent, or Firm*—Michael G. Harms; Patrick M. Sheldrake

(57) ABSTRACT

A guard for a sickle of an agricultural plant cutting machine includes a forwardly extending finger including a longitudinally extending, upwardly facing surface extending over the sickle, which includes a rearwardly facing air discharge nozzle therein located above and/or forwardly of the sickle, and the finger includes an air flow passage extending internally therethrough from an air inlet adjacent to a base of the finger to the nozzle, for delivering a flow of pressurized air thereto, the nozzle being at least mostly flush with or recessed into the upwardly facing surface. As a result, the nozzle is operable for discharging the flow of air rearwardly over the finger without obstructing plant material flow thereover, the air flow being sufficient to blow at least a substantial amount of loose grain and other plant material located forwardly of the front edge of a header floor of the machine, onto the floor for collection by a conveyor of the header for processing.

16 Claims, 4 Drawing Sheets

US 7,870,713 B2

SICKLE GUARD WITH INTEGRAL STREAMLINED AIR DISCHARGE SYSTEM FOR BLOWING PLANT MATERIAL TOWARD A HEADER OF AN AGRICULTURAL PLANT CUTTING MACHINE

TECHNICAL FIELD

This invention relates generally to a header of an agricultural cutting machine, such as a combine, windrower or other crop harvesting machine, or a mower, and more particularly, to a guard for a sickle of a header, integrally incorporating an air discharge system including streamlined, non-obstructive air outlets operable for effectively directing pressurized air rearwardly over the sickle and toward a floor or pan of a header, for blowing cut plant material, particularly loose grain and the like, onto a floor or pan of the header, so as to avoid loss of the material, without interfering with the cutting action or plant flow over the guard.

BACKGROUND ART

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally through slots in, or over, forwardly projecting, spaced apart guards. The knife assembly moves back and forth in a reciprocating movement to move the knives relative to the guards so that the leading knife edges of the knives cross over the guards or through the slots in the guards. This produces a shearing or cutting action which severs plant stems and stalks or other material which flows into and is captured in the spaces between the knives and the guards.

In operation, as the crop cutting machine moves forwardly over a field, it is desirable for the plant stems and stalks to flow smoothly and uninterruptedly into the spaces between the guards, so as to be cleanly severed by the knives. It is also desired for the cut plant material to flow smoothly and largely uninterruptedly over the sickle, not bunch up thereon, and flow or fall onto a floor or pan of the header, particularly when the cutting machine is a harvester. Often, harvesters also include a rotary reel disposed over the sickle to facilitate the induction of the plants into the sickle, clear cut plant material from the sickle, and help move the cut crops onto the header floor. On the header, the cut crop material is typically conveyed sidewardly toward the center of the header, by an auger or belt, for induction into a feeder of the machine or other apparatus.

A problem that can occur, however, when cutting crops in the above manner, is that sometimes as a result of the cutting action, crops will not be inducted into the header, but instead will be lost. For instance, as a result of a dull or worn sickle, the crop stalks or stems may be jerked, bent, and/or torn instead of cleanly cut, which can shake grain loose from the crop before it enters the header, such that some of the loose grain can fall to the ground in front of the header. The bats or tines of reel can also strike the crops and shatter pods, etc., to loosen or thresh the grain so as to be lost, particularly under dry conditions. Still further, the augers for conveying the cut crops toward the center of the header can include fingers that operate to pull the cut crops into the auger, which can unintentionally thresh some of the grain from the crop. As a result, a significant amount of loose grain can be present in the forward region of a header, on and above the sickle and guards, which is at risk of loss if not conveyed or inducted onto the header.

Numerous devices and systems have been developed over many years, in attempts to blow loose grain toward the header. Reference in this regard, the system utilizing pressurized air directed through nozzles or jets on or in connection with the sickle guards disclosed in McDonnell U.S. Pat. No. 6,085, 510, issued Jul. 11, 2000. However, an observed shortcoming of the embodiment of the system of the McDonnell patent illustrated in FIGS. 1-3 of that patent, is that the air nozzles or outlets are located in the slots of the guards in which the sickle knives move. In a second embodiment shown in FIG. 4 and subsequent Figures of the McDonnell patent, nozzles project sidewardly from the guards into the spaces between the adjacent guards, so as to be located in the crop flow paths along and between the guards. Reference also, Phillips U.S. Pat. No. 2,718,744, issued Sep. 27, 1955; and Klinger U.S. Pat. No. 2,737,006, issued Feb. 26, 1954. The Phillips and Klinger patents also utilize pressurized air nozzles, but located on structures on the guards or extending forwardly therefrom (Phillips massively so), and which also extend sidewardly into the crop flow path (more so in Klinger) so as to possibly interfere with crop flow to the cutting region between the sickle knife and side of the guard. Any outward projection of a nozzle into the crop flow path can result in contact with crop plants forwardly of the front edge of the header pan that can jar the plants, to cause them to drop grain, which can fall between the guards so as to be lost. The air flow ducts of Phillips and Klinger are also significantly larger than the guards and extend beneath the guards, so as to limit the positioning options of the guards and the header relative to the ground, particularly the closeness to the ground and the ability to orient the guards toward the ground. The Phillips and Klinger air flow ducts are also exposed to damage from contact with the ground.

Thus, what is sought is an air discharge system for guards of a sickle of a header of an agricultural plant cutting machine, that is effective for discharging flows of air rearwardly, for directing loose grain and other crop elements toward the header, yet which is unobtrusive and overcomes one or more of the problems, disadvantages, and shortcomings referenced above.

SUMMARY OF THE INVENTION

What is disclosed is an integral air discharge system for guards of a sickle of a header of an agricultural plant cutting machine, such as, but not limited to, a combine, windrower, or the like, that is effective for discharging flows of air rearwardly, for directing loose grain and other crop elements toward the header, yet which is unobtrusive and overcomes one or more of the problems, disadvantages, and shortcomings referenced above.

According to a preferred aspect of the invention, a guard for a sickle of an agricultural plant cutting machine includes a base configured for mounting to a header of a plant cutting machine adjacent to a forward edge of an upwardly facing floor of the header, and an elongate finger attached to the base and oriented relative thereto so as to extend forwardly therefrom when mounted to a header. The finger includes a forward tip portion opposite the base, the finger including a slot extending sidewardly therethrough intermediate the base and the tip portion and configured for cooperatively receiving a sickle knife for reciprocating sideward movement relative to the finger. The finger includes opposite side surfaces adjacent to opposite ends of the slot and against which the sickle knife will cut plants when reciprocated sidewardly relative to the finger, and the finger including a longitudinally extending, upwardly facing surface extending from the base to the forward tip portion. The upwardly facing surface includes a rearwardly facing air discharge nozzle therein, and the finger includes an air flow passage extending internally therethrough from an air inlet adjacent the base to the nozzle for delivering a flow of pressurized air thereto, the nozzle being at least mostly flush with or recessed into the upwardly facing surface. As a result, the nozzle is operable for discharging the flow of air rearwardly over the finger without obstructing plant material flow thereover. Preferably, the pressure of the air will be sufficient to blow at least a substantial amount of loose grain and other plant material located forwardly of the front edge of the header floor, onto the header floor for collection by a conveyor of the header for processing.

According to another preferred aspect of the invention, the air inlet is disposed beside the base, and is connected to a suitable source of pressurized air, which can be, for instance, an air compressor located on the plant cutting machine, or on the header itself. According to another preferred aspect, the guard is configured in side by side spaced apart relation with one or more additional guards, so as to be conveniently jointly mountable to a header. And, a joint air inlet or separate inlets can be provided in connection with the air flow passages, as desired or required for a particular application.

According to still another preferred aspect of the invention, the nozzle is integrated into the upwardly facing surface of the finger forwardly of or above the slot containing the sickle knife, so as to be positioned just forwardly of, or over a forward region of, the cutting region of the sickle, such that the air flow discharged from the nozzle will be strongest at the location where the most loose grain is anticipated to be present. To facilitate this positioning, the air passage will preferably include a lower portion which extends forwardly under the slot, and an upper portion in connection with the lower portion and extending upwardly and possibly rearwardly to the nozzle.

Optional aspects of the invention include a shallow concave channel or recess rearwardly of the nozzle, wherein the nozzle is oriented to discharge the flow of air through the channel, thereby facilitating the desired smooth, uninterrupted flow of plant material over the nozzle, while providing a desired airflow pattern. Alternatively, the nozzle can be flush with the surface of the finger. As another option, one or more additional nozzles can be incorporated into the upper surface of the finger, arranged in a predetermined array, and the nozzle or nozzles can be configured to discharge the flows of air therefrom in a predetermined pattern, such as a tightly focused rearwardly directed pattern, or a broader fan pattern, as determined at least in part by the effect sought to be achieved.

DETAILED DESCRIPTION OF THE INVENTION

Figure 1:
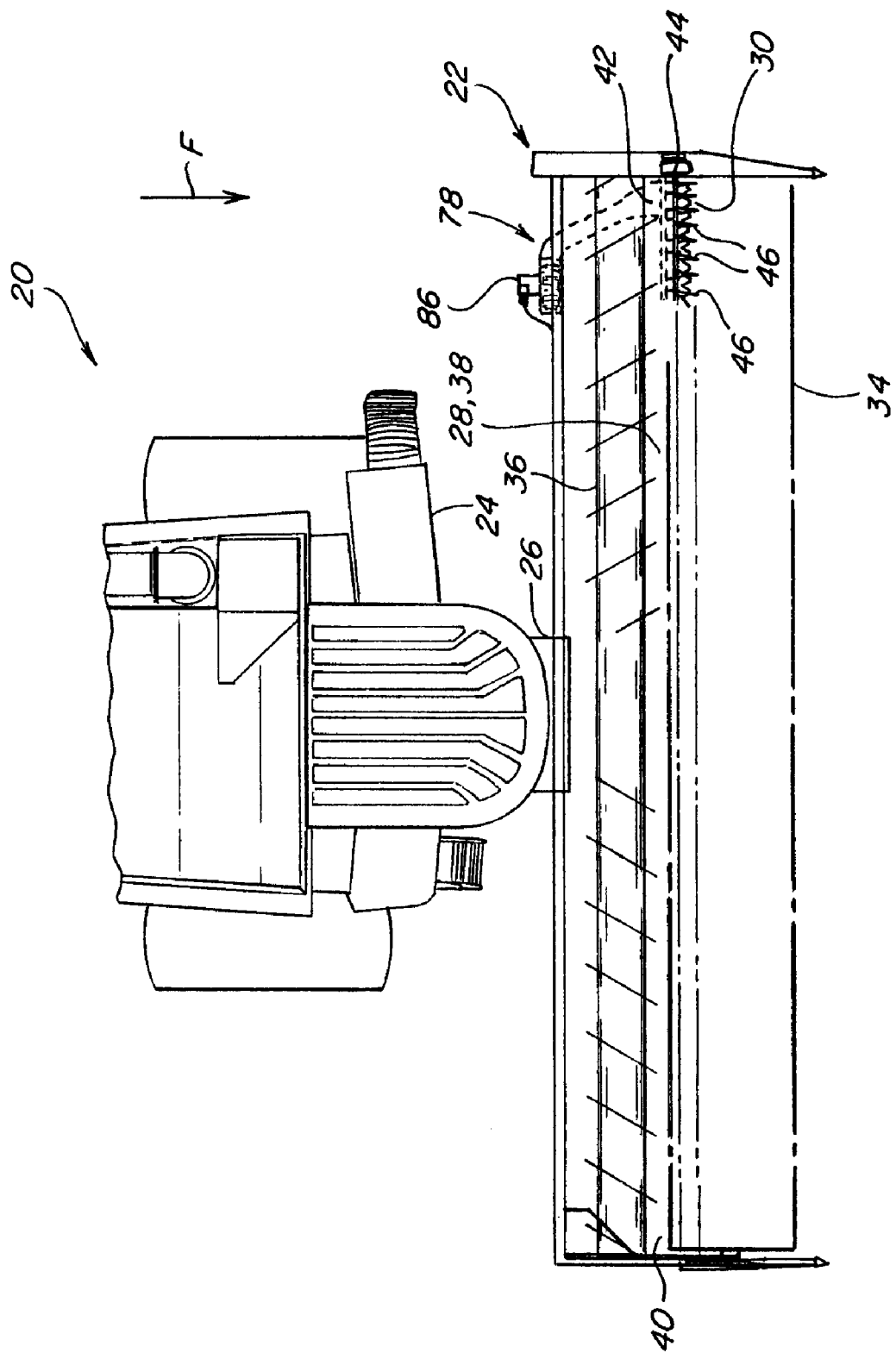
FIG. 1 is a top view of a combine including a header having an air discharge system for the sickle thereof, including air discharge nozzles incorporated into guards of the sickle, according to the present invention.

Turning now to the drawings wherein several preferred embodiments of the invention are shown, in FIG. 1, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field, as denoted by arrow F.

Figure 2:
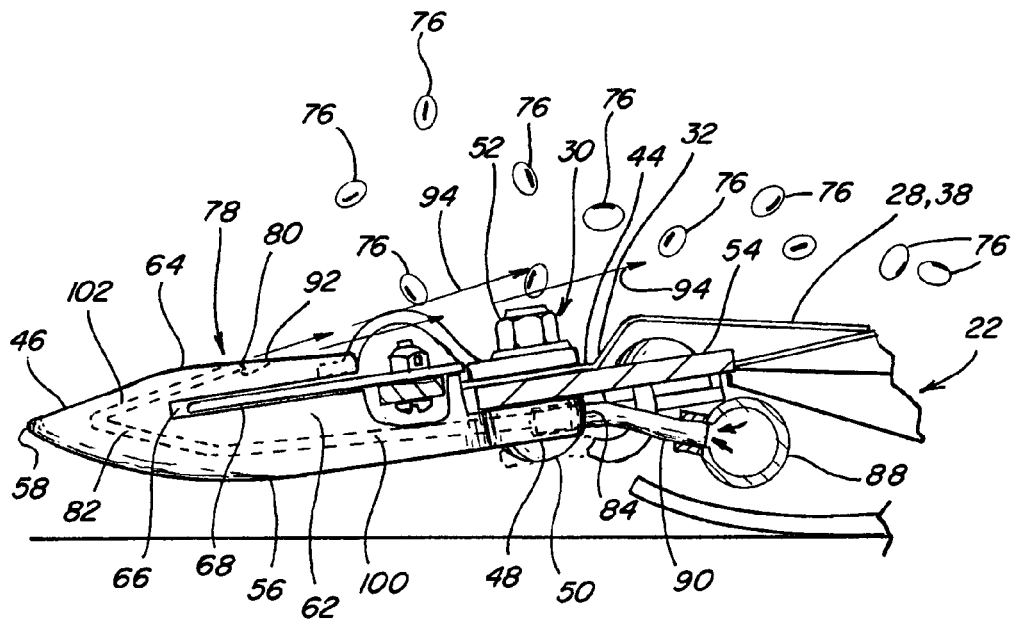
FIG. 2 is an enlarged fragmentary side view of the header of FIG. 1, showing a representative sickle guard and a preferred manner of incorporation of the air discharge system of the invention into the guard, and illustrating discharge of air from a nozzle of the system and the effect thereof on loose grain above the sickle.

Referring also to FIG. 2, which is a side view of header 22, header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the crop for induction into header 22, as will be explained. Header 22 additionally includes an elongate, sidewardly extending reel 34 (shown in outline form in FIG. 1) disposed above sickle 30 and rotatable in a direction for facilitating induction of the severed crops into header 22. An elongate, rotatable auger 36 (also shown in outline form in FIG. 1) that extends in close proximity to a top surface 38 of floor 28 and has helical flights therearound is operable in cooperation with reel 34 for conveying the severed crops toward an inlet opening of feeder 26 for induction into combine 20, in the well-known manner.

Referring more particularly to FIG. 1, sickle 30 extends in a sideward direction along the width of floor 28, between a first side edge portion 40 of the floor, and an opposite second side edge portion 42. Sickle 30 includes an elongate, sidewardly extending cutter bar assembly 44 supported in substantially longitudinally aligned relation adjacent to forward edge portion 32 of floor 28, along the length thereof.

Figure 3:
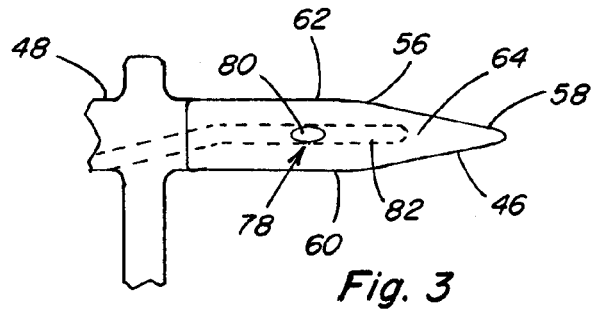
FIG. 3 is a simplified fragmentary top view of a representative sickle guard, illustrating a manner of incorporation of a nozzle of the system of the invention incorporated into an upwardly facing surface of the guard.
Figure 4:
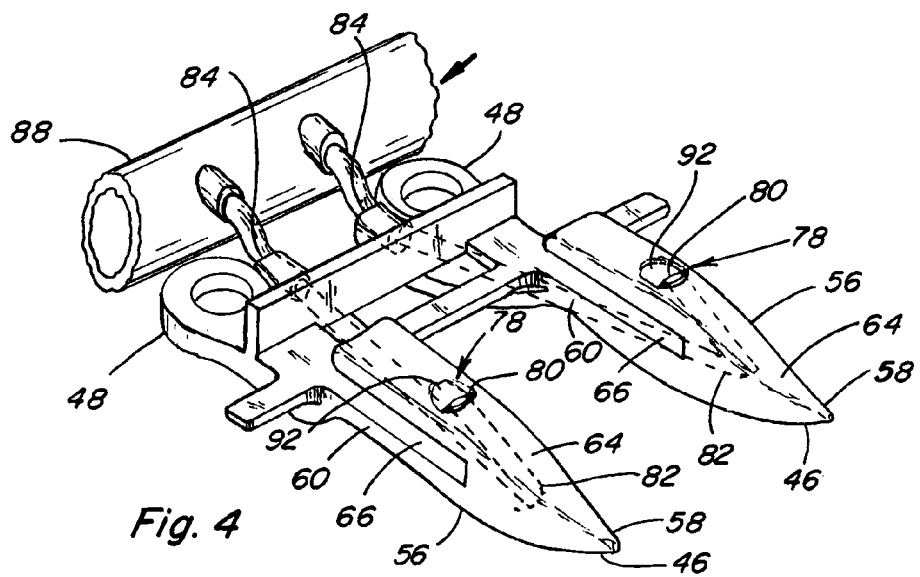
FIG. 4 is a fragmentary perspective view of a pair of guards for a sickle, showing elements of the air discharge system of the invention incorporated therein.
Figure 5:
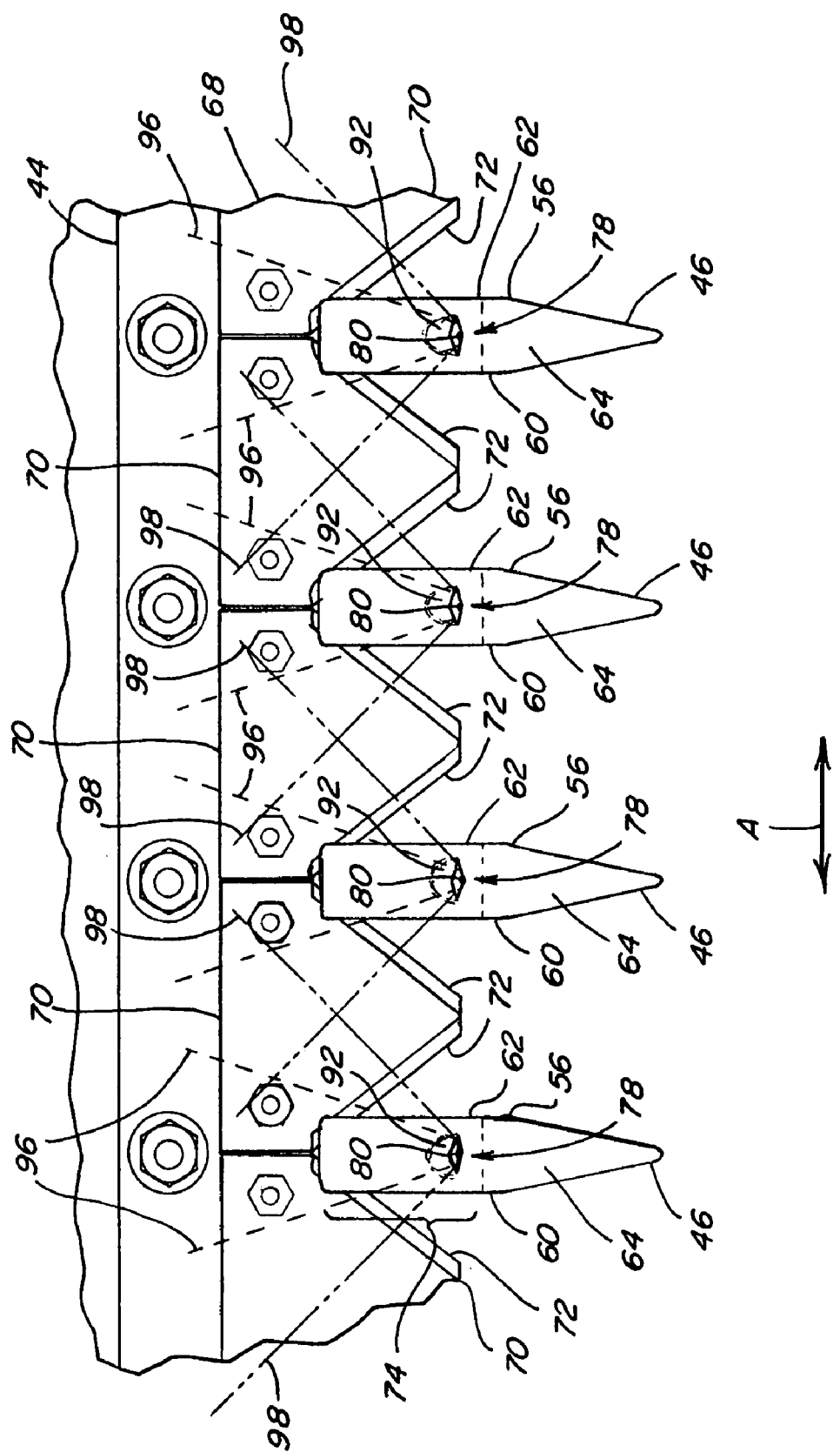
FIG. 5 is a fragmentary top view of the header, showing another embodiment of an air discharge nozzle usable with the system of the invention, and illustrating different air discharge patterns that can be achieved using different nozzles with the invention.

Referring also to FIGS. 3, 4 and 5, cutter bar assembly 44 includes a plurality of forwardly extending, elongate guards 46 arranged in a sidewardly extending, spaced apart array, along the forward edge portion of header 22. Each guard 46 is preferably of cast metal and includes a rearwardly located base 48, which is suitably attached, here by a bolt 50 and a nut 52, to a fixed bar 54 or other fixed structure of assembly 44.

Here, it can be observed that guards 46 are provided in pairs connected together by a crossmember, although it should be understood that, alternatively, they could be provided individually, or connected together in a greater number, with equal utility for the purposes of the present invention. Each guard 46 additionally includes a forwardly extending finger 56 attached to base 54, finger 56 having a forwardly located forward tip 58. Each finger 56 includes oppositely facing side surfaces 60 and 62 which extend forwardly from adjacent base 48 to tip 58, and which taper convergingly as they approach tip 58. Each finger 56 also includes an upwardly facing surface 64 which extends from base 48 to tip 58. Each finger 56 includes a slot 66 extending therethrough between side surfaces 60 and 62, intermediate base 48 and tip 58, slots 66 of the respective fingers 56 being aligned along the length of sickle 30.

Referring more particularly to FIGS. 2 and 5, cutter bar assembly 44 supports an elongate sickle knife 68 for reciprocating longitudinal movement within slots 66, knife 68 including a row of knife sections 70 including oppositely facing, angularly related knife edges 72 which, in conjunction with site surface 60 or 62 of adjacent guards 50, respectively, effect a shearing or cutting action which severs plant stems and stalks or other material captured between the knives and the guards as the knife sections are reciprocatingly moved sidewardly, as denoted by arrow A in FIG. 5. Guards 46 will typically extend beyond sickle knife 68 by no more than 12 inches, as it may be desired under some conditions to have a capability to point the guards downwardly at a small acute angle to the ground, for instance, with the sickle close to the ground, for harvesting downed crops, without the guard tips entering the ground. It is also desirable for the guards to have a smooth streamlined shape, which is relatively narrow, so as to smoothly guide the crops into the spaces therebetween, for cutting.

As noted above under the Background Art heading, as combine 20 is moved forwardly over a field containing crops, sickle knife 68 will be moved reciprocatingly sidewardly relative to guards 46, to sever the crops which enter the spaces between guards 46. Knife edges 72 will capture and cut the stems or stalks of the crop plants against the side surface 60 or 62 of the adjacent guard, in an area denoted as a cutting zone 74 illustrated in relation to the leftmost guard 46 in FIG. 5. As a result of the cutting action, and particularly if the crop is dry and/or knife edges 72 are dull, and/or the side edge of the slot is worn and rounded, and also as a result of being batted by reel 34, grain can be loosened from the crop plants, e.g., pods shattered, such that the loose grain will fall onto sickle 30, and onto any plant material thereon, so as to be in danger of falling to the ground and being lost. Grain can also be shaken loose if the guards are large, or are not sufficiently streamlined for smooth crop flow therepast, or have obstructions that extend into the crop flow path, so as to shake or jar the crops as they are inducted into the sickle. This can be particularly problematic in drilled crops which lack defined rows and thus increase the possibility of guards 46 being propelled directly into plants during the cutting operation. Referring more particularly to FIG. 2, loose soybeans 76 are depicted in the area above sickle 30, as would be typically present during the harvesting of crops such as soybeans or other legumes, as well as other small grains. If not captured, at least some of loose grains 76 would typically be lost, for instance by falling through the spaces between knife sections 70 and guards 46, or by falling forwardly over the front edge of the sickle.

To avoid or reduce the occurrence of grain loss in the above described manner, an air discharge system 78 is incorporated into some and preferably all of guards 46 of sickle 30, according to the present invention. Air discharge system 78 includes at least one rearwardly facing air discharge nozzle 80 incorporated into upwardly facing surface 64 of each finger 56, and an air flow passage 82 extending internally through each finger 56 from an air inlet 84 located adjacent to base 48, to nozzle 80, for delivering a flow of pressurized air thereto. The pressurized air is provided by a suitable source thereof, such as, but not limited to, an air pump or air compressor 86 disposed at a suitable location, such as on header 22, and which is suitably powered, for instance, by a fluid motor, belt, shaft, chain, or the like, in the well-known manner. Compressor 86 is connected to air inlets 84, for delivering pressurized air thereto, via an air distribution system which will preferably include a main air manifold 88 extending sidewardly beneath floor 28 of header 22, and including a plurality of nipples or small air distribution tubes 90 emanating therefrom at appropriately spaced locations therealong corresponding to the locations of air inlets 84. Smaller air distribution tubes 90 are shown extending from manifold 88 individually to air inlets 84. Alternatively, it should be recognized that a variety of different air distribution system configurations can be utilized according to the present invention.

The configuration and location of air discharge nozzles 80 on surfaces 64 of respective fingers 56 can be varied according to the preferences and/or requirements for a particular application. Generally, it will be an objective of the invention for nozzles 80 to be minimally if at all obstructive to crop and plant flow over and passed fingers 56, such that little or no resultant additional jarring or disturbing of the plants passing over the nozzle occurs so as to result in additional loosening of grain from the plants. Additionally according to the invention, an objective will be to generate rearwardly directed pressurized air flows that will be effective in blowing and directing loose grain on to floor 28 to capture the loose grain and prevent loss thereof. Further according to the invention, it will be an objective to minimize susceptibility of plugging of nozzles 80 by plant material and the like. Still further, it will be an objective when incorporating nozzles 80 and air flow passages 82 into fingers 56, to maintain and not significantly degrade the structural integrity of the fingers, or to materially change the operability thereof. In accordance with the above objectives, several embodiments of nozzle configurations of the invention are illustrated in FIGS. 2 through 9.

Figure 6:
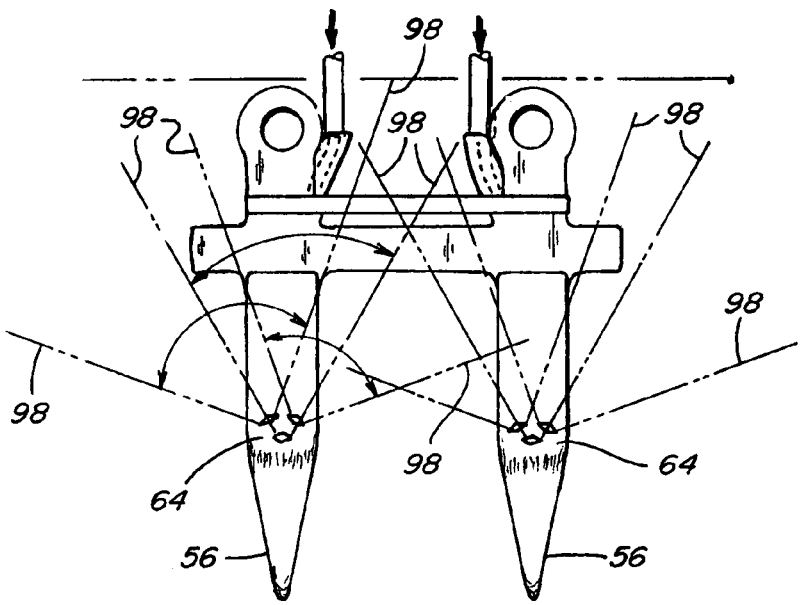
FIG. 6 is a top view of a pair of guards illustrating still another embodiment of air discharge nozzles usable with the system of the invention, and illustrating still different air discharge patterns achievable with the different nozzles.
Figure 7:
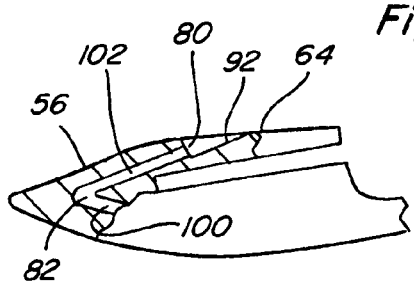
FIG. 7 is an enlarged fragmentary partial sectional side view of a guard, illustrating a manner of incorporation of air flow passages and a nozzle of the system of the invention therein.
Figure 8:
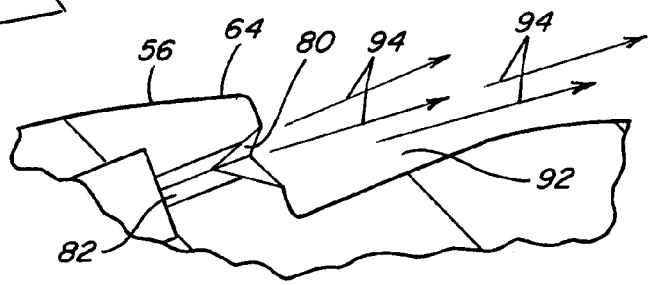
FIG. 8 is an enlarged fragmentary sectional side view of a guard, showing a nozzle, and illustrating discharge of a flow of air therefrom.
Figure 9:
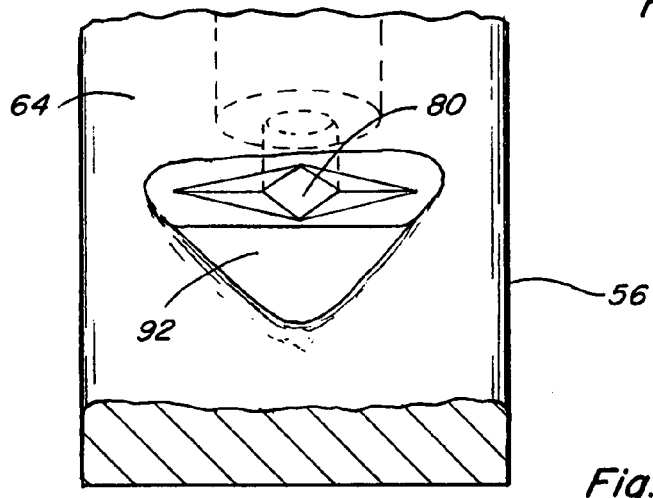
FIG. 9 is a fragmentary top view of the guard of FIG. 8, in partial section.

Referring more particularly to FIGS. 2, 4, 5, and 7 through 9, nozzles 80 are illustrated as rearwardly directed and recessed into upwardly facing surface 64 of fingers 56. Of these, nozzles 80 of FIGS. 2, 4, 5 and 8 are circular shaped, and nozzles 80 of FIGS. 8 and 9 are diamond shaped. This represents a range of acceptable nozzles and is thus not intended to be limiting. Each nozzle 80 is also illustrated disposed at a forward end of a rearwardly extending recessed channel 92, which, in cooperation with the nozzle configuration, facilitates and guides the pressurized air flow in a desired pattern, without significantly disrupting crop flow over upwardly facing surface 64 of the finger. However, it should be noted that other locations, including a more forward location, can be utilized according to the invention. Referring more particularly to FIG. 2, the pressurized air flow, denoted by arrows 94, is illustrated as flowing along a relatively low, rearwardly directed trajectory over sickle 30 and forward edge portion 32 of floor 28. Referring in particular also to FIG. 5, FIGS. 5 and 6, Air flow 94 is also illustrated from the side in FIG. 8. Here, it should be recognized that the configuration, including but not limited to, size, shape, and angular orientation, of nozzles 80 can be determined for a particular application, as can the configuration, e.g., size, shape and angular orientation of the channel 92 if used. FIG. 5 illustrates possible air flow patterns that can be achieved with the nozzles of the invention, including a narrower pattern that generally extends over the base region of the guard in which the nozzle is located, as defined by lines 96 emanating from the respective nozzles, and a wider fan shape pattern that extends over a greater portion of the sickle knives also, as defined generally be lines 98.

Referring in particular to FIG. 3, a nozzle 80 which is substantially flush with surface 64 is shown, the nozzle having a generally oval or tear drop sectional shape when viewed from above. Again, this illustrates the variety of nozzle configurations that can be used according to the invention.

Referring more particularly to FIG. 6, still another nozzle configuration is illustrated, which is a multiple nozzle arrangement including an array of three nozzles 80 disposed in surface 64, facing in slightly offset directions, and configured to discharge streams of pressurized air in a wide ranging fan pattern, illustrated again by lines 98 emanating from each of the nozzles. Here, it should be noted that the number of nozzles, positions, and orientations, on a finger can be varied, as desired or required for a particular application.

In the fore and aft direction, nozzles 80 are preferably disposed so as to most advantageously direct the pressurized air for recovering or protecting from the loss of loose grain, without degrading the integrity and strength of the fingers. In the embodiments shown, nozzles 80 are generally located above a forward region of slot 66 through which the sickle knife reciprocates. To achieve this location, air flow passage 82 has a generally V shape, including a lower portion 100 which is routed forwardly through the finger below slot 66, and an upper portion 102 which connects with lower portion 100 and extends rearwardly therefrom to the nozzle, or nozzles, as variously shown in the FIGS. Air flow passage 82 can be cast in place in the finger. Essentially, the fore and aft location selected here has been found to be advantageous as it places the nozzles close to the cutting zone where the largest portion of the loose grain has been typically found to be present, such that the air will be at its greatest pressure where the grain is found, and will be less likely to be dissipated by intervening plant material such as leaves, stems and the like which will be passing through the cutting zone also.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A guard for a sickle of an agricultural plant cutting machine, comprising:
    a base configured for mounting to a header of a plant cutting machine adjacent to a forward edge of an upwardly facing floor of the header;
    an elongate finger attached to the base and oriented relative thereto so as to extend forwardly therefrom when mounted to the header, the finger including a forward tip portion opposite the base, the finger including a slot extending sidewardly therethrough intermediate the base and the tip portion and configured for cooperatively receiving a sickle knife for reciprocating sideward movement relative to the finger, the finger including opposite side surfaces adjacent to opposite ends of the slot and against which the sickle knife will cut plants when reciprocated sidewardly relative to the finger, the finger including a longitudinally extending, upwardly facing surface extending generally from the base to the forward tip portion; and
    the upwardly facing surface including a rearwardly facing air discharge nozzle incorporated therein, and the finger including an air flow passage extending internally therethrough from an air inlet adjacent the base to the nozzle for delivering a flow of pressurized air thereto, the nozzle being at least mostly flush with or recessed into the upwardly facing surface for discharging the flow of air rearwardly over the finger without obstructing plant material flow thereover, wherein the nozzle is disposed above the slot, wherein the upwardly facing surface includes a shallow concave channel rearwardly of the nozzle, and the nozzle is oriented to discharge the flow of air through the channel.

2. The guard of claim 1, wherein the air inlet is disposed beside the base.

3. The guard of claim 1, wherein the air flow passage extends forwardly beneath the slot and rearward over a forward end of the slot to the nozzle.

4. The guard of claim 3, wherein the air flow passage is V-shaped when viewed from the side.

5. The guard of claim 1, wherein the finger comprises a plurality of the nozzles arranged in a predetermined array in the upwardly facing surface.

6. The guard of claim 5, wherein the nozzles are configured to discharge the flow of air in a predetermined pattern over a rear end of the finger.

7. The guard of claim 6, wherein the predetermined pattern comprises a fan pattern.

8. The guard of claim 1, wherein the guard is of cast metal construction and the nozzle and the air flow passage are cast in the finger.

9. A guard for a sickle of an agricultural plant cutting machine, comprising:
    a base configured for mounting to a header of a plant cutting machine adjacent to a forward edge of an upwardly facing floor of the header; and
    an elongate finger extending from the base and having a forward tip portion opposite the base, the finger being oriented relative to the base so as to extend forwardly therefrom to the tip portion when the base is mounted to the header, the finger including a slot extending sidewardly therethrough intermediate the base and the tip portion, the slot being configured for cooperatively receiving a sickle knife for reciprocating sideward movement therethrough, the finger including opposite longitudinally extending side surfaces located adjacent to opposite ends of the slot and against which plants are to be severed by the sickle knife when reciprocatingly moved, the finger having an upwardly facing surface, the upwardly facing surface including a rearwardly directed air discharge nozzle therein located above and forwardly of the slot, and the finger including an internal air flow passage connecting with the nozzle, the air flow passage including a lower passage portion extending forwardly through the finger beneath the slot from an inlet opening disposed adjacent to the base, and an upper passage portion connecting to the lower passage portion and extending rearwardly through the finger to the nozzle, the nozzle being mostly flush with or below the upwardly facing surface for discharging air rearwardly over the finger without obstructing plant material flow thereover, wherein the upwardly facing surface includes a shallow concave channel rearwardly of the nozzle, and the nozzle Is oriented to discharge the air through the channel.

10. The guard of claim 9, wherein the finger comprises a plurality of the nozzles arranged in a predetermined array in the upwardly facing surface.

11. The guard of claim 10, wherein the nozzles are configured to discharge the flow of air in a predetermined pattern over a rear end of the finger.

12. The guard of claim 11, wherein the predetermined pattern comprises a fan pattern.

13. The guard of claim 9, wherein the guard is of cast metal construction and the nozzle and the air flow passage are cast in the finger.

14. The guard of claim 9, wherein the inlet opening is disposed beside the base.

15. The guard of claim 9, wherein the inlet opening is disposed in a casting beside the base.

16. A header for an agricultural plant cutting machine, comprising:
   an elongate upwardly facing floor having a longitudinally extending forward edge; and
   a sickle including a plurality of elongate, forwardly extending guards mounted to the header at spaced locations along the forward edge of the floor, each of the guards having an upwardly facing surface extending over a slot, the sickle including an elongate sickle knife extending through the slots of the guards, the sickle knife being configured to be reciprocatingly moved through the slots relative to the guards for severing plants against opposite sides of the guards; and
   the upwardly facing surfaces of the guards including rearwardly directed air discharge nozzles therein located forwardly of or above the slot of the guard, respectively, and each of the guards including an internal air flow passages connecting with the nozzle thereof, each of the air flow passages including a lower passage portion extending forwardly through the guard beneath the slot thereof, and an upper passage portion connecting to the lower passage portion and extending through the guard to the nozzle, respectively, each of the nozzles being flush with or below the upwardly facing surface for discharging air rearwardly over the guard toward the floor without obstructing plant material flow over the guard, wherein the upwardly facing surface includes a shallow concave channel rearwardly of the nozzle, and the nozzle is oriented to discharge the flow of air through the channel.

* * * * *